United States Patent
Dold et al.

(10) Patent No.: US 11,703,058 B2
(45) Date of Patent: Jul. 18, 2023

(54) METHOD FOR PRODUCING A DRIVE UNIT DEVICE

(71) Applicant: ebm-papst St. Georgen GmbH & Co. KG, St. Georgen (DE)

(72) Inventors: Juergen Dold, Schonach (DE); Julian Wege, Villingen-Schwenningen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 470 days.

(21) Appl. No.: 16/768,574

(22) PCT Filed: Dec. 19, 2018

(86) PCT No.: PCT/EP2018/085785
§ 371 (c)(1),
(2) Date: May 29, 2020

(87) PCT Pub. No.: WO2019/141477
PCT Pub. Date: Jul. 25, 2019

(65) Prior Publication Data
US 2020/0340484 A1 Oct. 29, 2020

(30) Foreign Application Priority Data
Jan. 17, 2018 (DE) .................. 10 2018 101 000.1

(51) Int. Cl.
*H02K 15/03* (2006.01)
*F04D 25/06* (2006.01)
(Continued)

(52) U.S. Cl.
CPC ........... *F04D 25/06* (2013.01); *F04D 29/601* (2013.01); *H02K 1/278* (2013.01); *H02K 15/03* (2013.01);
(Continued)

(58) Field of Classification Search
CPC ....... F04D 25/06; F04D 29/601; H02K 1/278; H02K 15/03; H02K 2213/12; B21D 39/048; B23P 11/005; F05B 2230/60
See application file for complete search history.

(56) References Cited

U.S. PATENT DOCUMENTS

2011/0169367 A1 7/2011 Bourqui et al.
2016/0172910 A1 6/2016 Saito et al.

FOREIGN PATENT DOCUMENTS

CN 202367082 U 8/2012
DE 102012100158 A1 7/2012
(Continued)

OTHER PUBLICATIONS

International Search Report and Written Opinion, which issued in corresponding PCT Patent Application No. PCT/EP2018/085785.
(Continued)

*Primary Examiner* — Thomas Truong
(74) *Attorney, Agent, or Firm* — Dickinson Wright PLLC

(57) ABSTRACT

The invention relates to a method for producing a drive unit device, in particular a fan device, which has at least one first modular unit (12) and at least one second modular unit (16), which concentrically accommodates at least a portion of the first modular unit (12), with the first and second modular units (12, 16) being intended to contribute mechanically to a change in torque, and the first modular unit (12) being secured in the second modular unit (16) in at least one method step (100, 110). To increase safety and reduce process costs, it is proposed that the first modular unit (12) be secured in the second modular unit (16) by means of at least one concentric pressing process step.

9 Claims, 2 Drawing Sheets

Figure 1:
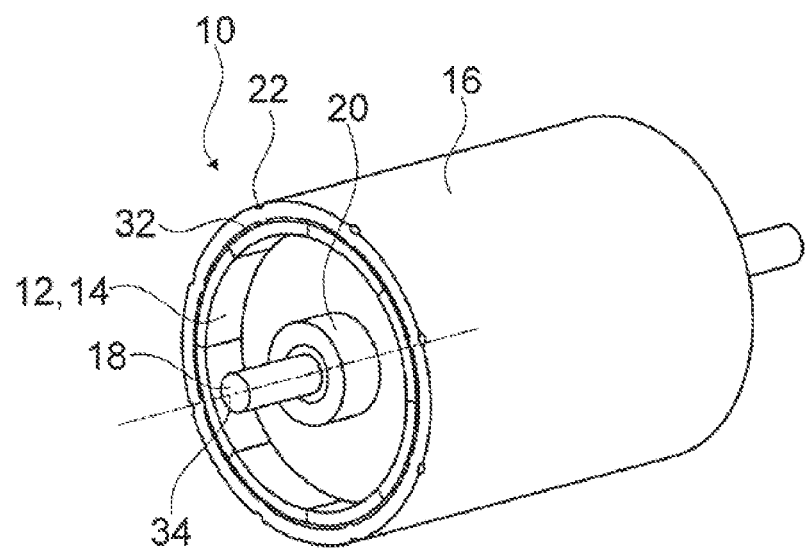

(51) Int. Cl.
    *F04D 29/60*     (2006.01)
    *H02K 1/278*     (2022.01)
    *B23P 11/00*     (2006.01)
    *B21D 39/04*     (2006.01)

(52) U.S. Cl.
    CPC .......... *B21D 39/048* (2013.01); *B23P 11/005* (2013.01); *F05B 2230/60* (2013.01); *H02K 2213/12* (2013.01)

(56) References Cited

FOREIGN PATENT DOCUMENTS

| | | |
|---|---|---|
| DE | 102013217021 A1 | 3/2014 |
| DE | 102015226720 A1 | 1/2017 |
| JP | 2005073409 A | 3/2005 |
| JP | 2007043845 A | 2/2007 |
| JP | 2009095108 A | 4/2009 |
| JP | 2016084718 A * | 5/2016 |
| JP | 2016084718 A | 5/2016 |

OTHER PUBLICATIONS

German Examination Report dated Aug. 21, 2018, which issued in the corresponding German Patent Application No. 10 2018 101 000.1.

Chinese Notification of the Second Office Action and the Supplementary Search Report dated Oct. 11, 2021, which Bsued in corresponding Chinese Patent Application No. 201880062001.2.

* cited by examiner

METHOD FOR PRODUCING A DRIVE UNIT DEVICE

The invention relates to a method for producing a drive unit device according to the preamble of claim 1, a drive unit device that is produced by said method according to claim 1, and a drive unit, in particular an electric motor, having a drive unit device.

Electric motors in which the stators are secured within a housing by means of an adhesive process or a shrink fitting process are already known in the prior art. In an adhesive process, an adhesive is applied to a point that will be bonded, and is then cured by an activator. In a shrink fitting process, the housing is first heated, causing it to expand. The stator is then inserted into the housing. The housing contracts as it cools, thereby securing the stator.

The object of the invention is, in particular, to provide a method that features improved properties as compared with conventional adhesive and shrink fitting processes. The object is achieved according to the invention by the features of claim 1, while advantageous embodiments and refinements of the invention may be found in the dependent claims.

The invention relates to a method for producing a drive unit device, in particular a fan device, which comprises at least one first modular unit and at least one second modular unit, which concentrically accommodates at least a portion of the first modular unit, particularly in a fully assembled state, the first and second modular units being intended to contribute mechanically to a change in torque, wherein the first modular unit is secured in the second modular unit in at least one method step.

It is proposed that the first modular unit be secured in the second modular unit by at least one concentric pressing process step.

"Intended" is understood in particular to mean specifically designed and/or equipped. The specification that an object is intended for a specific function is understood in particular to mean that the object fulfills and/or performs that specific function in at least one application and/or operating state.

A "drive unit device" is understood in particular as a device that is intended to contribute at least partially to a generation and/or maintenance of a movement of at least one element. In particular, the drive unit device is a part, in particular a component, of a drive unit, in particular of an electric motor and/or of a pump and/or of a generator. The drive unit device may comprise a stator unit, in particular. A "stator unit" is understood in particular as a unit that is arranged statically within a housing unit of the drive unit device and contributes at least partially to the generation and/or maintenance of the movement of the element. Advantageously, the stator unit has at least one electromagnet. It is also conceivable for the drive unit device to have a transmission unit. Preferably, the drive unit device is configured as a fan device. Particularly preferably, the drive unit device is configured as an electric motor device.

The specification that the second modular unit "concentrically accommodates at least a portion of the first modular unit" is understood in particular to mean that the two modular units are arranged concentrically to one another and that the second modular unit accommodates at least a portion of the first modular unit. The specification that the second modular unit "accommodates at least a portion of" the first modular unit is understood in particular to mean that the first modular unit is arranged, in particular, at least 50%, advantageously at least 70%, and especially advantageously at least 90% by mass and/or by volume within the smallest possible convex envelope that is only just encompassed by the second modular unit. During assembly, the first modular unit is preferably inserted into the second modular unit by a translational movement.

A "concentric pressing process" is understood in particular as a process in which an object to be pressed is arranged such that a press unit surrounds it concentrically. During the pressing process, a concentric movement of the press unit in the direction of the center point exerts a concentric pressing force onto the object. A deformation of the object is advantageously achieved as a result. The press unit may have, in particular, at least one hose and/or at least one press jaw.

The configuration according to the invention makes it possible, in particular, to dispense with conventional adhesive and shrink fitting methods for securing a component. The use of adhesives, activators, and complex shrink fitting systems can thus be avoided. As a result, processing costs can advantageously be reduced. Particularly advantageously, safety can thereby be increased. In particular, the use of toxic and/or environmentally harmful substances and/or high temperatures can be avoided. Additionally, process errors caused by incompletely cured adhesive and/or insufficient contraction of the second modular unit during cooling can be avoided. This can also increase flexibility. In particular, a more flexible choice of coloring of the two modular units is possible, since a color change resulting from high temperatures can be avoided. Process speeds can preferably be increased as a result. In particular, wafting times required for curing an adhesive and/or for cooling the modular units can be avoided.

It is further proposed that the second modular unit be produced in the pressing process step by a deformation of at least one basic modular unit. A "basic modular unit" is understood in particular as a unit that is intended to be transformed by at least one predefined method step into a modular unit. The basic modular unit differs from the second modular unit particularly by a deformation of the second modular unit. The deformation may be visually inconspicuous, in particular. Advantageously, the deformation is located within a predefined section of the basic modular unit. Preferably, the deformation of the basic modular unit causes an interstice between the first modular unit and the basic modular unit to be at least partially filled in. A successful securing of the first modular unit can advantageously be verified quickly and easily by analyzing the deformation visually. Particularly advantageously, the interstice allows the first modular unit to be inserted quickly and easily into the second modular unit. In this way, safety can be increased, in particular, and the first modular unit can be easily secured.

In a further variant of the invention it is proposed that in the pressing process step, the basic modular unit is deformed using a hydraulic press. The hydraulic press is advantageously configured as a hose press. A "hose press" is understood in particular as a device that is intended for implementing a concentric pressing process, with the press unit of said press having at least one tubular element. Particularly advantageously, the hydraulic press has a plurality of press jaws arranged in a circle. In the pressing process step, the press jaws are moved in particular at a predefined speed from the outside inward, thereby exerting a predefined force in particular along the direction of movement of each individual press jaw. In this step, the press jaws are moved in particular up to a predefined radius. The predefined force and/or the predefined speed and/or the predefined movement distance can advantageously be adjusted as desired. This advantageously enables a dimensional tolerance of the deformation to be reduced with repeated application of the method. In particular, the deformation can be adjusted precisely for any configuration. As a result, accuracy can advantageously be increased. If the configuration of the deformation used is changed, a first set of press jaws of the hydraulic press can preferably be replaced quickly and easily by a second set of press jaws adapted to the new configuration. In this way, flexibility can be increased.

It is further proposed that a cylindrical basic shape be used for the basic modular unit. A "cylindrical basic shape" of an object is understood in particular to mean a design of the shape of the object in which the smallest possible convex envelope that only just surrounds the object completely is in the shape of a cylinder. The basic modular unit may conceivably be configured in particular as an open hollow cylinder. Advantaaeously, the basic modular unit is configured as a hollow cylinder that is closed at least at one end. The basic modular unit advantageously has a higher receiving volume, in particular as compared with a basic modular unit that has a cuboid basic shape with the same amount of material. Manufacturing costs and/or installation space, in particular, can be reduced as a result.

It is further proposed that at least one metallic material be used for the second modular unit. Advantageously, aluminum and/or steel and/or zinc and/or iron and/or an appropriate alloy is/are advantageously used for the second modular unit. In particular, the second modular unit may be partially made of the metallic material. It is conceivable for only a portion of the second modular unit to be made of the metallic material. Advantageously, only this portion is deformed during the hydraulic pressing process step. Preferably the entire second modular unit is made of the metallic material. In particular, cracks and/or undesirable additional deformations of the second modular unit can be avoided by the deformation. Sturdiness can be increased as a result.

In a further embodiment of the invention, it is proposed that a cylindrical basic shape be used for the first modular unit. In particular, the cylindrical basic shape of the first modular unit has a smaller radius than the cylindrical basic shape of the basic modular unit. It is conceivable for the first modular unit to be semicircular in particular. Preferably, the first modular unit is configured in particular as annular. Advantageously, the first modular unit has a higher receiving volume, in particular as compared with a first modular unit that has a cuboid basic shape with the same amount of material used. In this way, manufacturing costs and installation space, in particular, can be reduced.

Further proposed is a drive unit device, produced by a method according to the invention. In this way, safety, flexibility, and/or process speed can advantageously be increased.

It is further proposed that the second modular unit should have a plurality of impressions arranged circumferentially. The impressions are created in particular by the deformation of the basic modular unit. Advantageously, the impressions are arranged with periodic spacing from one another. The impressions may feature, for example, at least one circular impression and/or at least one cuboid impression and/or at least one annular impression. Advantageously, the spacing and the shape of the impressions can be easily varied to enable different configurations of the deformation. This enables an increase particularly in flexibility.

It is further proposed that the second modular unit be configured as a housing unit. In particular, the second modular unit defines an interior space. The first modular unit is preferably arranged at least 50%, advantageously at least 70%, and especially advantageously at least 90% by mass and/or by volume within the interior space. The second modular unit can especially be accessed from the exterior. This serves to increase the ease of use.

It is further proposed that the first modular unit be configured as a stator unit. The first modular unit advantageously has at least one electromagnet. In an alternative embodiment, the first modular unit can also be configured as a transmission element of a transmission unit. This enables the at least partial accommodation of the first modular unit by the second modular unit to be utilized in a meaningful way.

Further proposed is a drive unit having a drive unit device according to the invention. The drive unit is preferably configured as an electric motor. In this way, safety, flexibility, and process speed can advantageously be increased.

Further advantages will be evident from the following description of the set of drawings. The drawings depict an exemplary embodiment of the invention. The drawings, the description, and the claims contain numerous features in combination. A person skilled in the art will expediently also consider the features individually and will combine them to form other useful combinations.

Figure 2:
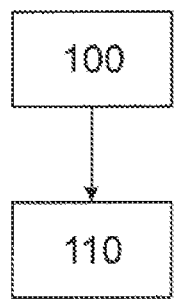
Figure 3:
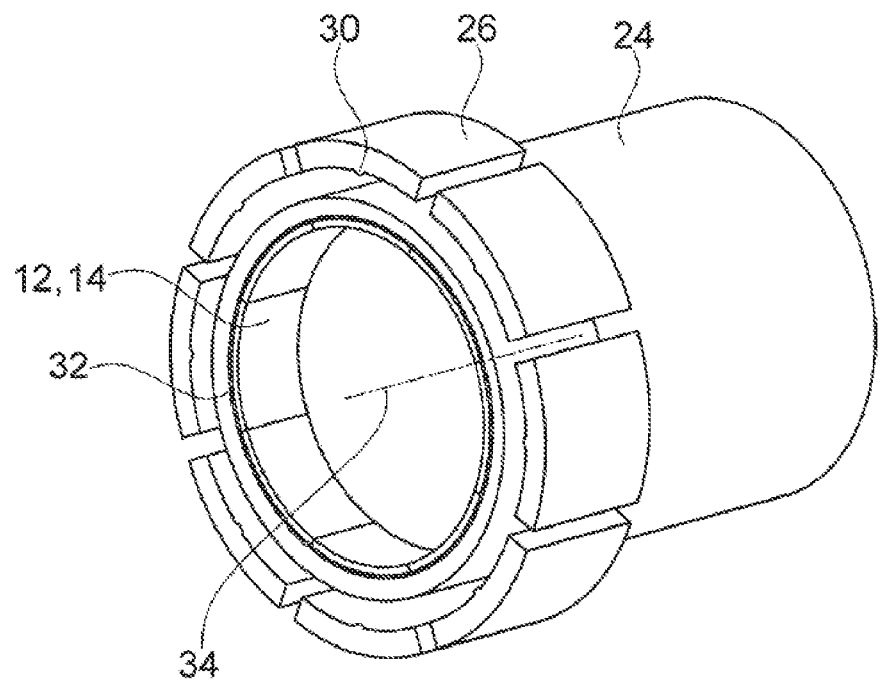
Figure 4:
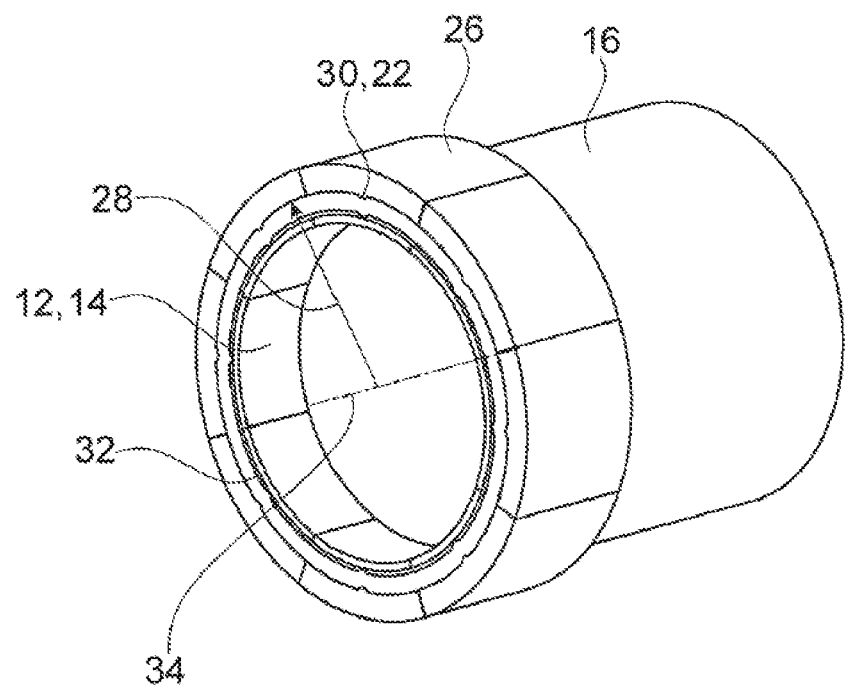

In the drawings:

FIG. 1 shows a drive unit having a drive unit device that has a first modular unit and a second modular unit, FIG. 2 shows a schematic flow chart illustrating the method for producing the drive unit device, FIG. 3 depicts a first method step of a method for producing the drive unit device, and FIG. 4 depicts a second method step of the method for producing the drive unit device.

FIG. 1 shows a drive unit 10 configured as an electric motor. Drive unit 10 can especially be part of a fan. Drive unit 10 has a drive unit device. The drive unit device has a first modular unit 12, which is configured as a stator unit. The first modular unit 12 has a cylindrical basic shape, and more particularly, the first modular unit 12 is configured as annular. The first modular unit 12 comprises a plurality of sections 14. Each section 14 has an electromagnet (not shown). Each of the electromagnets is intended to have its polarity repeatedly reversed. The electromagnets thus have a common polarity reversal frequency. The drive unit device has a second modular unit 16, which is configured as a housing unit. The second modular unit 16 has a cylindrical basic shape, and more particularly, the second modular unit 16 is shaped as a dosed hollow cylinder. In the interest of clarity, in FIG. 1 walls of the second modular unit 16 are not shown. The second modular unit 16 may be partially or entirely made of aluminum and/or zinc and/or steel and/or iron. In the present case, the second modular unit 16 is made entirely of aluminum.

The second modular unit 16 has a deformation 22. Deformation 22 is configured as a periodic arrangement of impressions. The impressions are circular. Alternatively, deformation 22 may be formed from any arrangement of annular and/or cuboid impressions. The first modular unit 12 and the second modular unit 16 are arranged concentrically with one another around an axis 34. The first modular unit 12 is accommodated entirely by the second modular unit 16. An interstice 32 is formed between the first modular unit 12 and the second modular unit 16. At points where the second modular unit 16 has deformation 22, interstice 32 is filled in by deformation 22. Deformation 22 secures the first modular unit 12 within the second modular unit 16 in a positive connection. Drive unit 10 has a rotor unit 18 with a drive shaft. Rotor unit 18 has a screw unit (not shown). The screw unit is intended for moving air. Rotor unit 18 has a permanent magnet 20. Permanent magnet 20 is configured as a cylindrical ring. In an operational state, the polarity reversal of the electromagnets within sections 14 generates a torque of rotor unit 18 similarly to the prior art for electric motors. Axis 34 is congruent with an axis of rotation of rotor unit 18.

FIG. 2 shows a schematic flow chart illustrating the method for producing the drive unit device. In one method step 100, the first modular unit 12 is inserted into a basic modular unit 24. The first modular unit 12 is inserted into basic modular unit 24 by a translational movement of the first modular unit 12 parallel to axis 34. The translational movement can be performed using methods for automatic translational movement sequences that are known from the prior art. For example, the translational movement may be performed by means of a robotic arm. Alternatively, the first modular unit 12 may be inserted manually into basic modular unit 24.

In a further method step 110 that follows method step 100, a deformation 22 of basic modular unit 24 is performed by means of a hydraulic pressing process step. The hydraulic pressing process step is carried out by means of a hydraulic press (not shown). The hydraulic press has a set of press jaws 26. Press jaws 26 are arranged in a circle on mounts (not shown) of the hydraulic press. During the second method step 110, press jaws 26 are moved uniformly concentrically inward. During this movement, all press jaws 26 are moved with a predefined amount of force and at a predefined speed. This concentric movement continues up to a predefined radius 28. This radius 28 is selected such that pressing surfaces 30 of press jaws 26 exert a pressing force on basic modular unit 24. The pressing force deforms basic modular unit 24. Deformation 22 turns basic modular unit 24 into second modular unit 16. It should be mentioned here that the production of drive unit 10 according to FIG. 1 requires additional method steps that are known in the prior art and for that reason will not be explained in more detail here.

FIG. 3 shows a first modular unit 12 and a basic modular unit 24 after the first method step 100. Basic modular unit 24 has a cylindrical basic shape. In particular, basic modular unit 24 is configured as a hollow cylinder that is closed at one end. The drive unit device is arranged in a position relative to the hydraulic press in which press jaws 26 are arranged concentrically around the drive unit device.

FIG. 4 shows a first modular unit 12 and a second modular unit 16 after the second method step 110. Press jaws 26 are arranged along a circle that has the predefined radius 28. Press jaws 26 rest flush against one another. Alternatively, press jaws 26 may be spaced apart from one another after the second method step 110. Pressing surfaces 30 are positioned within deformation 22 of second modular unit 16.

LIST OF REFERENCE SIGNS 10 drive unit
12 first modular unit
14 section
16 second modular unit
18 rotor unit
20 permanent magnet
22 deformation
24 basic modular unit
26 press jaw
28 radius
30 pressing surface
32 interstice
34 axis
100 method step
110 additional method step

The invention claimed is:

1. A method for producing a drive unit device, which has at least one first modular unit (12) and at least one second modular unit (16), which concentrically accommodates at least a portion of the first modular unit (12), wherein the first and second modular units (12, 16) are intended to contribute mechanically to a change in torque, wherein the first modular unit (12) is secured in the second modular unit (16) in at least one method step (100, 110), characterized in that the first modular unit (12) is secured in the second modular unit (16) by means of at least one concentric pressing process step;
wherein, in the at least one concentric pressing process step, at least one basic modular unit (24) is an object to be pressed and is arranged such that a press unit surrounds it concentrically and, during a pressing process, a concentric movement of the press unit in the direction toward a center point thereof exerts a concentric pressing force onto the at least one basic modular unit (24);
wherein, in the pressing process step, the basic modular unit (24) is deformed by means of a hydraulic press operating as the press unit; and
wherein the second modular unit (16) is produced in the pressing process step by the deformation (22) of the at least one basic modular unit (24).

2. The method according to claim 1, characterized in that a cylindrical basic shape is used for the basic modular unit (24).

3. The method according to claim 1, characterized in that at least one metallic material is used for the second modular unit (16).

4. The method according to claim 1, characterized in that a cylindrical basic shape is used for the first modular unit (12).

5. A drive unit device, produced by a method according to claim 1.

6. The drive unit device according to claim 5, characterized in that the second modular unit (16) has a plurality of impressions arranged circumferentially.

7. The drive unit device according to claim 5, characterized in that the second modular unit (16) is configured as a housing unit.

8. The drive unit device according to claim 5, characterized in that the first modular unit (12) is configured as a stator unit.

9. A drive unit (10), having a drive unit device according to claim 5.

* * * * *